E. A. PERKINS.
ROLLER BEARING.
APPLICATION FILED APR. 7, 1916.
1,212,253.
Patented Jan. 16, 1917.
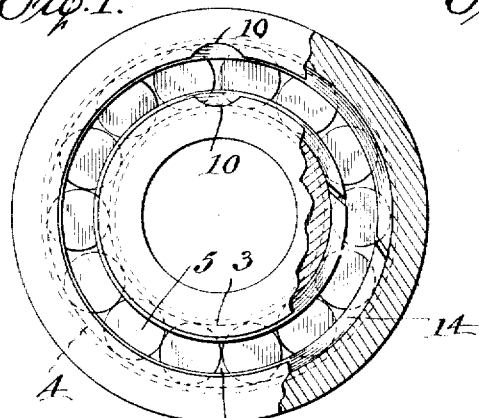
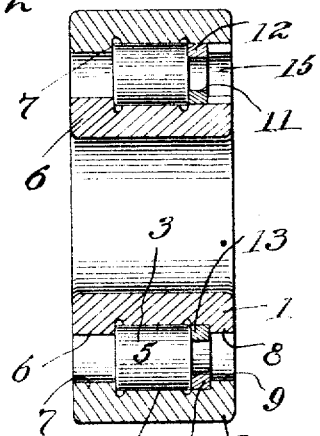
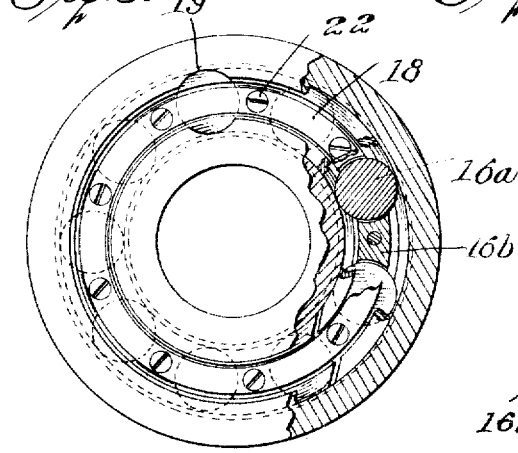
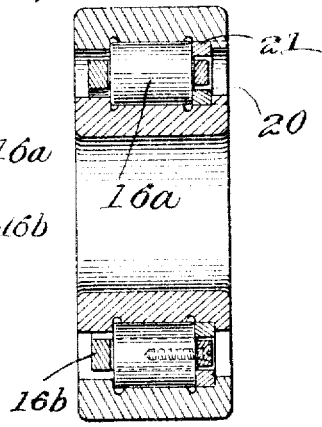
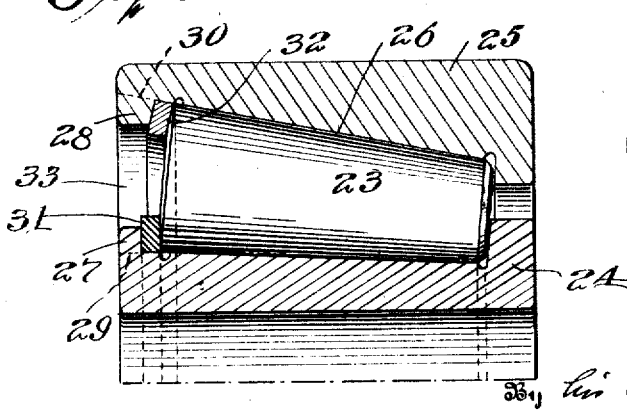
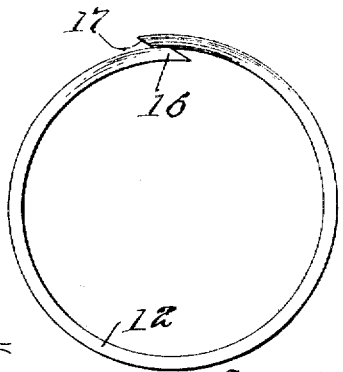
Inventor
Edwin A. Perkins
By his Attorney

UNITED STATES PATENT OFFICE.

EDWIN A. PERKINS, OF JAMAICA, NEW YORK.

ROLLER-BEARING.

1,212,253.             Specification of Letters Patent.       Patented Jan. 16, 1917.

Application filed April 7, 1916.   Serial No. 89,509.

*To all whom it may concern:*

Be it known that I, EDWIN A. PERKINS, a citizen of the United States, and resident of Jamaica, in the county of Queens and State of New York, have invented certain new and useful Improvements in Roller-Bearings, of which the following is a specification.

This invention relates to anti-friction bearings and is particularly applicable to roller bearings.

The principal object of the invention is to produce a simple roller bearing in which the rollers can be very readily inserted, and constructed so that the bearing can effectively resist end thrust forces.

A further object of the invention is to construct the bearing in such a way as to form an effective guide for the rollers and preventing any longitudinal shifting movement of the rollers on the races of the bearing.

Further objects of the invention will appear hereinafter.

The invention consists in the general combination of parts and in the simple features described in the following specification, while the broad scope of the invention is set forth in the appended claims.

In the drawing Figure 1 is an end elevation of the bearing embodying my invention partially broken away and shown in section. Fig. 2 is a longitudinal central section through the bearing shown in Fig. 1. Fig. 3 is a view similar to Fig. 1, but showing another type of roller bearing in which a separator or cage is used for the rollers. Fig. 4 is a longitudinal and vertical section of the bearing illustrated in Fig. 3. Fig. 5 is a side elevation showing a detail. Fig. 6 is a longitudinal, vertical section of a bearing embodying my invention, but employing conical rollers.

The bearing preferably comprises an inner ring 1 and an outer ring 2, and the adjacent faces of these rings are formed into race-ways or races 3 and 4 respectively for rollers 5. These rings also have projecting shoulders 6 and 7 respectively to engage the same ends of the rollers, and these shoulders operate to take the end thrusts of the bearing at one end. At the other end of the bearing the inner ring has an annular edge 8 and the outer ring has opposite to the annular edge 8 another annular edge 9.

In order to insert the rollers in the bearing, I prefer to form the annular edges 8 and 9 with recesses or notches 10, which when opposite to each other (see Fig. 1) form a filling opening through which each of the rollers, may be inserted by a longitudinal movement so as to pass the roller into the space between the races 3 and 4. In order to take the end thrusts at this end of the bearing and also to prevent any longitudinal shifting movement of the rollers as they move past these recesses or notches 10, I prefer to provide means including a split ring, and, if desired, I may employ two such split rings; for example, an inner split ring 12 and an outer split ring 11. The annular edges 8 and 9 are preferably undercut so as to form ring seats 13 and 14 to receive these split rings respectively. These split rings are preferably of resilient material such as spring steel or brass. The inner split ring tends to assume a relatively small diameter, smaller than the diameter of the annular opening 15, which is formed between the inner ring and the outer ring. After the rollers have been put in place this split ring 11 is slightly expanded and moved laterally into the annular opening 15 so as to come opposite the ring seat 13, whereupon when the ring is released it will assume a smaller diameter and place itself on its ring seat 13.

The outer split ring 12 tends to assume a relatively large diameter with respect to the annular opening 15. In order to place this ring in position, I prefer to press it so that its ends 16 will overlap each other (see Fig. 5). When sufficiently compressed in this way the ring may be passed through the annular opening 15, and then permitted to expand into its ring seat 14. I prefer to form the end 16 of this ring with the inclined end faces 17 and the ring is preferably overlapped in the manner indicated in Fig. 5 so that when it re-expands the end faces 17 will lie near each other and will give the effect of a scarf joint, that is to say, the extreme ends of the ring project beyond each other, which feature operates to insure that the ends of the rollers are constantly abutting the ring, and before the end of the roller passes off of one end of the ring it is already in contact with the other end of the ring.

Evidently, the annular opening 15, at least at the point where the ends 16 are overlapped, should be more than twice the width of the ends of the ring, but it is also obvious that the ends of the ring could be overlapped at the filling opening to permit the insertion of the ring.

My invention is applicable to a roller bearing of the type shown in Figs. 1 and 2, which carries loose rollers, but it is also applicable to other types of roller bearings; for example, a bearing in which the rollers are employed with separators. Such a bearing is illustrated in Figs. 3 and 4, in which the rollers 16ᵃ are carried in a separator or cage 16ᵇ. In assembling the parts of this type of bearing the cage 17 is put in place without its follower ring 18, and the rollers are inserted one by one at the filling opening, which is produced by the alinement of the oppositely placed recesses 19. When all the rollers have been inserted the split rings 20 and 21, which correspond to the rings 11 and 12, are inserted as described above, and after that the follower 18 is secured in the annular opening; that is, it is attached to the body of the cage by means of suitable fastening devices such as screws 22. In both types of the bearing I prefer to form the ends of the split rings with inclined faces so that the scarfed effect is produced on both split rings.

As another example of an application of my invention to a roller bearing, I shall describe its application to a bearing employing conical rollers; for example, such as the conical rollers 23 (see Fig. 6). This bearing includes an inner ring 24 and an outer ring 25, which may have a conical face 26. The annular edges 27 and 28 of these rings project toward each other so as to form shoulders, and at one point these shoulders may be recessed as indicated by the dotted lines 29 and 30 so as to form an opening to permit the insertion of the rollers 23. After the rollers are inserted they are held in place by an inner split ring 31 and an outer split ring 32 which may be inserted through the annular opening 33 of the bearing in the same manner as that described above in connection with the type of bearing shown in Figs. 1 and 2.

Attention is called to the fact that the rollers have substantially flat bearing faces adjacent the split rings which are flush with and bear against the inner faces of the rings. This form of the ends of the rollers permits of the free expansion or contraction of the split ring in the plane of the bearing faces of the rollers. This enables the split rings to be readily put in place without necessitating any excess of longitudinal play for the rollers after the rings are in place.

It is understood that the embodiment of the invention set forth herein is only one of the many embodiments the invention may take, and I do not wish to be limited in the practice of the invention nor in my claims to the particular embodiment set forth.

What I claim is:

1. A roller bearing comprising the combination of an inner ring having a race for the rollers and having a shoulder integral with the ring to abut the rollers at one end, an outer ring having a race for the rollers and having an integral shoulder to abut the same ends of the rollers, said shoulders operating to take the end thrusts in the bearing on one end, said rings having opposite annular edges with recesses therein coöperating when opposite to each other to form a filling opening to permit the insertion of each roller by a longitudinal movement into the space between said races, means including a split ring mounted in one of said annular edges and projecting across the filling opening to prevent the rollers from shifting longitudinally in the races and thereby taking the end thrusts of the bearing at the other end, and a plurality of rollers in said races abutting said shoulders and said split ring, said rollers adjacent said split ring having substantially flat bearing faces flush with the inner face of said split ring whereby the said bearing faces of said rollers permit the free expansion or contraction of the split ring in the plane of the said bearing faces of the rollers.

2. A roller bearing comprising the combination of an inner ring having a race for the rollers and having a shoulder integral with the ring to abut the rollers at one end, an outer ring having a race for the rollers and having an integral shoulder to abut the same ends of the rollers, said shoulders operating to take the end thrusts in the bearing at one end, said rings having opposite annular edges with recesses therein coöperating when opposite each other to form a filling opening to permit the insertion of each roller by a longitudinal movement into the space between said races, said annular edges having annular ring seats formed therein, and a split ring mounted in each of said annular ring seats and projecting across the edges of the filling opening to prevent the rollers from shifting longitudinally in the races; said split rings taking the end thrusts in the bearing at the other end, and a plurality of rollers in said races abutting said shoulders and said split rings, said rollers adjacent said split rings having substantially flat bearing faces flush with the inner faces of said split rings whereby the said bearing faces of said rollers permit the free expansion or contraction of said split rings in the plane of said bearing faces of said rollers.

3. A roller bearing comprising the combination of an inner ring and an outer ring with an annular opening between said rings, said rings each having a race for rollers and each having a projecting shoulder to abut the same ends of the rollers, the said rings adjacent the opposite ends of the rollers each having an undercut annular ring seat, an inner split ring tending to assume a relatively small diameter and expansible so as to be insertible through said annular opening and to enable the said ring to contract into the annular ring seat of said inner ring, an outer split ring tending to assume a relatively large diameter and contractible to permit the same to be inserted through said annular opening, so that said outer split ring can expand into the said ring seat of said outer ring, and a plurality of rollers abutting at one end against said shoulders and at the other end against said split rings.

4. A roller bearing comprising the combination of an inner ring and an outer ring with an annular opening between said rings, said rings each having a race for the rollers and each having a projecting shoulder to abut the same ends of the rollers, the said rings adjacent the opposite ends of the rollers each having an undercut annular ring seat, an inner split ring tending to assume a relatively small diameter and expansible so as to be insertible through said annular opening and to enable the said ring to contract into the annular ring seat of said inner ring, an outer split ring tending to assume a relatively large diameter and constructed so that its ends may overlap to permit the same to be inserted through said annular opening, and so that said outer split ring can expand into the said ring seat of said outer ring, said annular opening constructed of more than twice the width of said outer split ring to permit the overlapped ends of said outer ring to be passed therethrough.

5. A roller bearing comprising the combination of an inner ring having a race for the rollers and an outer ring having a race for the rollers, said bearing having an annular opening between said rings, with recesses in the annular edges thereof constructed to aline and form a filling opening to permit the insertion of the rollers by a longitudinal movement thereof into the space between the races, and a split ring retained by the annular edge on each side of said annular opening and projecting across the recesses to prevent a longitudinal shifting of the rollers in the bearing.

Signed at New York city, in the county of New York, and State of New York this first day of April A. D. 1916.

EDWIN A. PERKINS.